United States Patent [19]

Krause et al.

[11] Patent Number: 4,945,554
[45] Date of Patent: Jul. 31, 1990

[54] TEST CIRCUIT ARRANGEMENT FOR COMPUTER-CONTROLLED COMMUNICATIONS SWITCHING SYSTEMS

[75] Inventors: Ruediger Krause, Berlin; Reinhard Foshag, Munich, both of Fed. Rep. of Germany

[73] Assignee: Siemens Aktiengesellschaft, Berlin and Munich, Fed. Rep. of Germany

[21] Appl. No.: 335,569

[22] Filed: Apr. 10, 1989

[30] Foreign Application Priority Data

Jul. 13, 1988 [DE] Fed. Rep. of Germany ....... 3824250

[51] Int. Cl.⁵ .......................... H04M 3/28; H04Q 1/22
[52] U.S. Cl. .......................................... 379/10; 379/15
[58] Field of Search ........................... 329/9, 10, 94, 15

[56] References Cited
U.S. PATENT DOCUMENTS 4,710,952 12/1987 Kobayashi ........................... 379/9 X

FOREIGN PATENT DOCUMENTS

DE3215663-
   C1  7/1983  Fed. Rep. of Germany .
DE3502564-
   C2  3/1987  Fed. Rep. of Germany .

Primary Examiner—Stafford D. Schreyer
Attorney, Agent, or Firm—Hill, Van Santen, Steadman & Simpson

[57] ABSTRACT

A test circuit arrangement for testing computer-controlled communications switching systems each having a central network and a central processor unit, as well as subscriber sets and/or line sets connectable to the network for analog and/or digital information transmission. These subscriber sets and/or line sets are in communication with the central processor unit under the control of a group processor unit adapted to the plurality of subscriber sets and/or line sets. A communications switching system to be tested is connected to a line trunk group configuration composed of subscriber and line sets, manual switching position and digital stations and is function-tested with a personal computer unit connectable via the group processor.

5 Claims, 1 Drawing Sheet

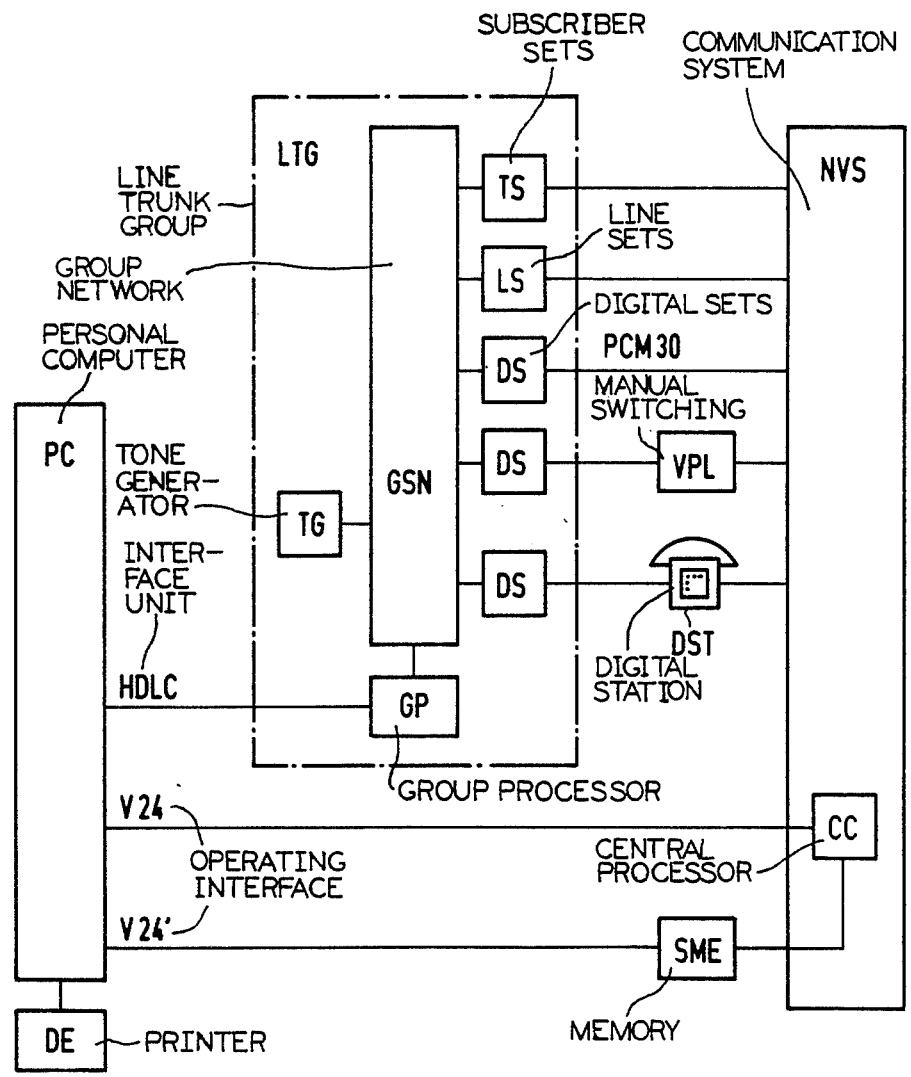

TEST CIRCUIT ARRANGEMENT FOR COMPUTER-CONTROLLED COMMUNICATIONS SWITCHING SYSTEMS

BACKGROUND OF THE INVENTION

The present invention is directed to a test circuit arrangement for testing computer-controlled communications switching systems having central network and a central processor unit. The systems also have subscriber sets connectable to the network and/or line sets for analog and/or digital information transmission that, in combination with the central processor unit, are under control of a group processor unit that is adapted to the plurality of subscriber sets and/or line sets.

A prior art test circuit arrangement of the type initially set forth is disclosed by German Patent No. 35 02 564. As disclosed, terminal equipment simulation means are optionally connected to the corresponding terminals of the system to be tested in order to be able to have function-conditioned test procedures. This testing concept is especially suited for testing procedures directly at the location at which these systems are physically located.

German Pat. No. 32 15 663 also discloses a farther-reaching test concept wherein what are referred to as simulation devices approximately represent an image of the telephone system to be tested. Corresponding test points are provided in the system to be tested, these test points, in combination with the connected simulation equipment, allowing an extremely detailed switching sequence in the simulations at the subscriber side and at the trunk line side. Although a great number of switching events, even in telephone systems of different sizes having different structures and many alternative function possibilities, can thus be tested, such testing equipment can be economically utilized only for smaller communications switching systems.

SUMMARY OF THE INVENTION

An object of the present invention is to provide a testing concept for communication systems of the more recent generation whose emphasis lies in the sequencing of more and more complex performance features. This testing concept permits these performance features to be completely acquired and to be implemented to the greatest degree as function and load tests in comparison to conventional manual testing methods. This is inventively achieved in that the test circuit arrangement has a line group configuration of the computer-controlled communication switching system that is allocated to a single group processor unit and is formed of subscriber sets and/or line sets; in that the group processor unit is connected to a personal computer unit via an interface unit; in that the personal computer unit is connected via an operating interface unit to the central processor unit that controls the operating system; and in that the test circuit arrangement contains a manual switching position and a digital station each of which can be respectively controlled by the group processor unit via a digital set and each of which is directly connected to the communications switching systems to be tested.

All interfaces of the system to be tested can be accessed with the test circuit arrangement of the present invention that, with its line group configuration, corresponds to a smaller sub-region of a communications switching system. The necessary switch functions can be exchanged with the system to be tested with the subscriber sets and line sets of the test circuit arrangement. What is important for the present invention in this context is that the structure of the test circuit arrangement represents a peripheral switching computer that has its group processor connected to the personal computer unit via the interface unit. Since the personal computer unit also has access to the central processor unit via the operating interface unit and, thus, has access to the operating system of the system to be tested, software function boosts can be sequenced in a very short time by use of a hardware configuration of this test circuit arrangement by executing correspondingly prepared test plans in machine fashion. In the final result, a regression test executed in such fashion also leads to a higher software quality standard within the system to be tested since potential functional disturbances are recognized early and can be correspondingly eliminated.

Since the test circuit arrangement of the present invention coincides with the function execution of a sub-region of the communications switching system, the degree of sophistication and the reliability of this test circuit arrangement must be considered extremely high for testing computer-controlled communications switching systems.

An advantageous development of the present invention provides that the personal computer unit has printer equipment serving the purpose of test logging allocated to it, so that the information flows can be documented in a known manner and error conditions can be recognized and eliminated as warranted.

A further advantageous development of the present invention provides that the personal computer unit is connected via a further operating interface unit to a memory means that stores updating or change requests. Changes or modifications for the communications switching systems to be tested can thus be acquired in a simple manner and can be evaluated for conversion inside the corresponding systems.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing in which:

The single Figure shows in block diagram form the switch equipment critical for an understanding of the present invention.

DESCRIPTION OF THE PREFERRED EMBODIMENT

The test circuit arrangement is essentially formed of the line trunk group configuration LTG and of the personal computer unit PC. the personal computer unit PC is connected via an interface unit HDLC to the group processor unit GP of the line trunk group configuration LTG and is in communication via an operating interface means V24, V24' with the central processor unit CC of the communications switching system NVS to be tested and with a memory means SME that stores updating change requests. The line trunk group configuration LTG that represents a sub-region of the communications switching system NVS contains the group network GSN to which the subscriber sets TS, line sets LS and digital sets DS are connected. The digital sets DS represent the connection to the group network GSN of the line trunk group configuration LTG for the digital line PCM30 as well as for the manual switching position VPL and for the digital station DST. It is further depicted that the group network GSN has access to a tone generator TG that emits what are referred to as multi-frequency telegrams for testing the voice paths, these multi-frequency telegrams acquiring the proper condition of these voice paths with corresponding receiver equipment. The personal computer unit PC is also connected to the printer equipment DE with which the test logging can be undertaken in a known manner.

In order to simulate the environment of the communications switching system in the system test and in order to remain neutral relative to the goal of the test itself, the interfaces to the outside world of the communications switching system NVS are connected to the subscriber sets TS, line sets LS and digital sets DS of the line trunk group configuration LTG. These sets within the line trunk group configuration LTG correspond to the assemblies of the communications switching system NVS to be tested and also have a bus structure thereof in combination with the control. The control of the peripheral switching computer according to the prescribed test procedure occurs with the personal computer unit PC that is connected via a serial 64 kBit channel having HDLC protocol for data protection to the line trunk group configuration LTG via the interface unit HDLC having the same designation. The further operating interface units V24, V24' are available for executing the operations-oriented requests to the communications switching system NVS. All active equipment such as subscriber and line sets TS, LS and the digital sets DS contain what are referred to as tone evaluations with which it is possible to interpret received tone patterns according to established pulse patterns. The voice line conditions can be identified with the established pulse patterns. The same is true of the call pattern identification with which the different signaling conditions within the system to be tested can be identified. For evaluating indicator information at digital terminal equipment and for emulation of actions such as pressing keys, lifting up the handset, plugging card readers in, etc., the appropriate terminal equipment such as the manual switching position VPL and the digital station DST are provided with a serial control line and are functionally linked to the line trunk group configuration LTG by the use of the digital set.

The abbreviations used in the exemplary embodiment are compiled below in alphabetical sequence and their significance as a function unit is listed with the corresponding company designation.

CC=Central Processor Unit - SSP 303
DE=Printer Equipment - PT 89
DS=Digital Set
   CDSCS/S 30810 - Q 1786-X
   DIU 30/S30810 - Q 1662-X
DST=Digital Station - DIGITE 260; DYAD
GP=Group Processor Unit - SSP 302 D
GSN=Group Network - MTS 16
HDLC=Interface Unit
   PC SCS/S 30809 - Q 8000-X
   HC SCS/S 30810 - Q 1812-X
LTG=Line trunk Group Configuration
LS=Line Set - TIKZ/S 30810 - Q 882-X
NVS=Communications Switching System
   KN-System - A 30808-X 5079-A
   KN-System 4100/A 30808-X 5136-A
PC=Personal Computer Unit - PCD-2 (Siemens); IBM AT
SME=Memory Means - MDS (Intel); SME (Siemens)
TG=Tone Generator
   TOG/S 30810 - Q 531-X
   GCG/S 30810 - Q 463-X
TS=Subscriber Set - THKZ/S 30810 - Q 263-A 100
V24=Operating Interface Unit - IV/S 30238 - Q 7807-X
VPL=Manual Switching Position - CD SCS/S 30810 - Q 1786-X The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A test circuit arrangement for testing computer-controlled communications switching systems each respectively having a central network and a central processor unit, as well as having a plurality of subscriber sets and/or line sets connectable to the network for analog and/or digital information transmission that, in combination with the central processor unit, are respectively under the control of a group processor unit adapted to the plurality of subscriber sets and/or line sets, comprising:

a line trunk group configuration of the computer-controlled communications switching system, the line trunk group configuration being allocated to a single group processor unit and being formed of subscriber sets and/or line sets;
   the group processor unit connected to a personal computer unit via an interface unit (HDLC);
   the personal computer unit connected via a first operating interface unit to the central processor unit that controls an operating system of the communication switching system; and
   a manual switching position device and a digital station each of which is controllable by the group processor unit via a digital set and each of which being directly connected t the communications switching system to be tested.

2. The test circuit arrangement according to claim 1, wherein the personal computer unit has a printer means serving the purpose of test logging allocated to it.

3. The test circuit arrangement according to claim 1, wherein the personal computer unit is connected via a second operating interface unit to a means for providing a memory that records requests, the means for providing a memory also connected to the central processor.

4. A test circuit arrangement for at least one testing computer-controlled communications switching system having a central network and a central processor unit, as well as having a plurality of subscriber sets and/or line sets connectable to the network for analog and/or digital information transmission that, in combination with the central processor unit, are respectively under the control of a group processor unit adapted to the plurality of subscriber sets and/or line sets, comprising:

a line trunk group configuration of the computer-controlled communications switching system, the line trunk group configuration being allocated to a single group processor unit and being formed of subscriber set and/or line sets;

the group processor unit connected to a personal computer unit via an interface unit (HDLC);

the personal computer unit connected via a first operating interface unit to the central processor unit that controls an operating system of the communication switching system;

a manual switching position device and a digital station each of which is controllable by the group processor unit via a digital set and each of which being directly connected to the communications switching system to be tested; and the personal computer unit being connected via a second operating interface unit to a means for providing a memory that records requests, the means for providing a memory also connected to the central processor.

5. The test circuit arrangement according to claim 4, wherein the personal computer unit has a printer means serving the purpose of test logging allocated to it.

* * * * *